United States Patent Office 3,274,250
Patented Sept. 20, 1966

3,274,250
N-PHENYL-N'-(1,2-DIMETHYLPROPYL)-p-PHENYLENEDIAMINES
Paul Schneider, Opladen, Germany, assignor to Farbenfabriken Bayer Aktiengesellschaft, Leverkusen, Germany, a German corporation
No Drawing. Filed Nov. 8, 1963, Ser. No. 322,524
Claims priority, application Germany, Nov. 21, 1962,
F 38,366
1 Claim. (Cl. 260—576)

This invention relates to rubber articles resistant to ozone and to antiozonants used in rubber.

It is known that everyday articles, which are produced from natural or synthetic rubber by vulcanization, show cracks when their surfaces are under mechanical stress and are exposed to atmospheric influences. The mechanical stress may be constant as a function of time (static) or periodically variable (dynamic). It is known that the ozone present in small concentration in the atmosphere is responsible for the formation of these cracks and that the nature of the elastomers employed for the articles in question is of particularly great importance as regards the resistance to this type of crack formation. For example, wholly or substantially saturated elastomers, such as silicone rubber or butyl rubber, have quite good resistivity to such degradation phenomena. In contrast to this, it is just those types of elastomers which are used on the largest scale in the rubber industry natural rubber and butadiene-styrene rubber, which are most susceptible to cracking.

It is known that vulcanizates of the last-mentioned elastomer can effectively be protected against the ozone crack formation by incorporation of derivatives of p-phenylenediamine. N-isopropyl-N'-phenyl-p-phenylenediamine is most widely used and this compound provides very good protection against both static and dynamic stressing. N,N'-dialkyl-p-phenylenediamines provide very good protection against static stress, but are generally less satisfactory against dynamic stress.

It has now been found that N-phenyl-N'-(1,2-dimethylpropyl)-p-phenylenediamine is particularly suitable as antiozonant in the production of rubber articles which are resistant to ozone.

The rubber articles protected by the compound used in accordance with the invention have distinct advantages, in tests both for static and for dynamic stress, in comparison with articles to which the best known antiozonants are added, the beginning of crack formation is longer delayed and the growth of the cracks is further slowed down.

The compound used according to the invention can satisfactorily be incorporated into and thoroughly distributed through rubber. It shows no tendency to bleed out when used in the proportions necessary for a protective action. The mechanical properties of the vulcanizates are not changed by the compound employed according to the invention. For example, quantities from 0.1 to 5 parts by weight, based on elastomer, are employed, and more especially quantities from 0.5 to 3%. The ozone preservatives used according to the invention can also be employed in conjunction with other ozone preservatives. Furthermore, the usual additives can be mixed with the polymers which are to be protected.

The antiozonant used according to the invention can be introduced into natural rubber and synthetic elastomers which contain double bonds, for example, polymers of butadiene, isoprene, dimethyl butadiene and their homologues, and also into copolymers of conjugated diolefines with polymerizable vinyl compounds, such as styrene, methylstyrene, divinylbenzene, acrylonitrile, methacrylonitrile, acrylates or methacrylates, as well as copolymers which are obtained from isoolefines, such as isobutylene or its homologues, and small quantities of conjugated diolefines. It is, in addition, also possible to protect polymers of chlorobutadiene, as well as copolymers of chorobutadiene with monoolefines and/or diolefines or polymerizable vinyl compounds.

EXAMPLE

*(a) Efficacy under static stressing*

The following mixtures of the type used for tread surfaces of automobile tires were prepared on the mill:

|  | Parts by Weight | | |
| --- | --- | --- | --- |
|  | 1A | 1B | 1C |
| Oil-extended styrene-butadiene rubber (37.5 parts by weight of oil to 100.0 parts by weight of elastomer) | 100 | 100 | 100 |
| Zinc oxide | 5 | 5 | 5 |
| Mineral oil plasticizer | 4 | 4 | 4 |
| Carbon black | 55 | 55 | 55 |
| Stearic acid | 2 | 2 | 2 |
| 2-benzthiazyl-N-cyclohexylsulfenamide | 1.3 | 1.3 | 1.3 |
| Sulfur | 1.6 | 1.6 | 1.6 |
| N-phenyl-N'-isopropyl-p-phenylenediamine |  | 2 |  |
| N-phenyl-N'-(1,2-dimethylpropyl)-p-phenylenediamine |  |  | 2 |

Test samples with the dimensions 0.4 x 4.5 x 4.5 cm. were produced from these mixtures and vulcanized (press vulcanization 30 minutes at 151° C.). The test samples were then clamped in a plastic frame in such a way that a strain of 10, 20 and 35% was produced at the surface. The samples thus bent were exposed to the weather for 3 months while facing south and without any covering. At intervals, as indicated in the following table, the crack formation was evaluated, both the total number of cracks visible with the naked eye and also their average length. The results are given below.

No. of cracks:
  No crack _____ 0
  1–3 cracks _____ 1
  4–9 cracks _____ 2
  10–27 cracks _____ 3
  28–81 cracks _____ 4
  82–243 cracks _____ 5
  More than 244 cracks _____ 6
Average length of cracks:
  Nothing found _____ 0
  Cracks just visible, up to 1 mm. _____ 1
  1–3 mm. _____ 2
  3–8 mm. _____ 3
  Over 8 mm. _____ 4

In the following table, the two evaluations are separated by an oblique line, the number of cracks always coming first.

VULCANIZATE 1A (FOR COMPARISON)

| Elongation (percent) | Evaluation after days | | | | | |
| --- | --- | --- | --- | --- | --- | --- |
|  | 0 | 2 | 8 | 20 | 50 | 100 |
| 10 | 0/0 | 3/1 | 4/2 | 5/2 | 5/2 | 5/2 |
| 20 | 0/0 | 4/1 | 5/2 | 6/2 | 6/2 | 6/2 |
| 35 | 0/0 | 5/1 | 6/1 | 6/2 | 6/2 | 6/2 |

VULCANIZATE 1B (FOR COMPARISON)

| 10 | 0/0 | 0/0 | 0/0 | 0/0 | 0/0 | 0/0 |
| 20 | 0/0 | 0/0 | 0/0 | 3/1 | 3/1 | 3/1 |
| 35 | 0/0 | 0/0 | 3/1 | 4/1 | 4/1 | 3/1 |

VULCANIZATE 1C

| | | | | | | |
|---|---|---|---|---|---|---|
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 0/0 | 2/1 | 3/1 |

REPETITION 1C

| | | | | | | |
|---|---|---|---|---|---|---|
| 10 | 0/0 | 0/0 | 0/0 | 0/0 | 0/0 | 0/0 |
| 20 | 0/0 | 0/0 | 0/0 | 0/0 | 0/0 | 0/0 |
| 35 | 0/0 | 0/0 | 0/0 | 0/0 | 0/0 | 0/0 |

(b) *Efficacy with dynamic stressing*

The following mixtures were prepared on the mill:

| | Parts by Weight | | |
|---|---|---|---|
| | 2A | 2B | 2C |
| Smoked sheets | 100 | 100 | 100 |
| Zinc oxide | 5 | 5 | 5 |
| Carbon black | 48 | 48 | 48 |
| Mineral oil plasticizer | 2.5 | 2.5 | 2.5 |
| Stearic acid | 3 | 3 | 3 |
| Sulfur | 2.5 | 2.5 | 2.5 |
| Paraffin | 0.8 | 0.8 | |
| 2-benzthiazyl-N'-cyclohexyl-sulfenamide | 0.5 | 0.5 | 0.5 |
| N-phenyl-N'-isopropyl-p-phenylenediamine | | 0.7 | |
| N-phenyl-N'-(1,2-dimethylpropyl)-p-phenylenediamine | | | 0.7 |

De Mattia test specimens according to DIN 53,522 were produced from the above mixtures by press vulcanization (30 minutes at 143° C.). The test elements were then subjected to a permanent bending test in the De Mattia apparatus according to DIN 53,522. A scale which extended from 10% crack formation (very few small cracks) up to 100% crack formation (total fracture), was used to judge crack formation. The following results were obtained:

| | No. of cycles (in thousands) until a crack formation of— | | | | | |
|---|---|---|---|---|---|---|
| Percent | 10 | 20 | 40 | 60 | 80 | 100 |
| Mixture No.: | | | | | | |
| 2A | 41 | 63 | 102 | 118 | 136 | 150 |
| 2B | 166 | 205 | 256 | 335 | 358 | 450 |
| 2C | 166 | 263 | 365 | 445 | 503 | |

(c) *Dynamic stressing at low frequency* ("semi-static stressing")

The mixtures were prepared as under (b).

Test strips with the dimensions 0.4 x 20 x 2.5 cm. were heated (30 minutes at 143° C.) The strips were loaded at one end with a weight of 2.5 kg., the free end of the test element was placed around a shaft and fixed to an upwardly and downwardly moving eccentric. The strips were then wound and unwound over the revolving shaft at a frequency of 6 per minute for 7 and 14 days respectively and then the crack formation which had occurred was compared with the following scale:

3—strong crack formation
2—moderate crack formation
1—weak crack formation
0—no crack formation The following results were obtained:

| Mixture No. | Elevation after days | |
|---|---|---|
| | 7 | 14 |
| 2A | 2-3 | 3 |
| 2B | 0-1 | 1 |
| 2C | 0 | 0-1 |

I claim:
N-phenyl - N' - (1,2 - dimethylpropyl) - p - phenylenediamine.

References Cited by the Examiner
UNITED STATES PATENTS

| 2,656,389 | 10/1953 | Johannesen | 260—576 |
| 2,692,288 | 10/1954 | Bell et al. | 260—576 |
| 2,734,808 | 2/1956 | Biswell | 44—74 |
| 2,809,955 | 10/1957 | Matheson et al. | 260—45.9 |
| 2,810,709 | 10/1957 | Eby | 260—45.9 |

FOREIGN PATENTS 811,220   4/1959   Great Britain.

CHARLES B. PARKER, *Primary Examiner.*
IRVING MARCUS, JOSEPH P. BRUST, *Examiners.*
D. R. MAHANAND, R. V. HINES, *Assistant Examiners.*